US 8,538,174 B2

(12) United States Patent
Hama et al.

(10) Patent No.: US 8,538,174 B2
(45) Date of Patent: Sep. 17, 2013

(54) IMAGE PROCESSING DEVICE

(75) Inventors: Mikiko Hama, Tokyo (JP); Takeshi Harano, Tokyo (JP)

(73) Assignee: Sony Corporation, Tokyo (JP)

(*) Notice: Subject to any disclaimer, the term of this patent is extended or adjusted under 35 U.S.C. 154(b) by 1408 days.

(21) Appl. No.: 11/587,045

(22) PCT Filed: Apr. 21, 2005

(86) PCT No.: PCT/JP2005/008094
§ 371 (c)(1),
(2), (4) Date: Jan. 22, 2007

(87) PCT Pub. No.: WO2005/104526
PCT Pub. Date: Nov. 3, 2005

(65) Prior Publication Data
US 2007/0196023 A1  Aug. 23, 2007

(30) Foreign Application Priority Data
Apr. 22, 2004 (JP) ................................. 2004-126382

(51) Int. Cl.
*G06K 9/36* (2006.01)
(52) U.S. Cl.
USPC .. 382/232; 382/274; 375/240.12; 375/240.29
(58) Field of Classification Search
USPC ............... 382/232, 274; 375/240.12, 240.29
See application file for complete search history.

(56) References Cited

U.S. PATENT DOCUMENTS

| 5,440,404 | A | | 8/1995 | Okamoto |
| 6,002,796 | A | * | 12/1999 | Kawa et al. ................... 382/168 |
| 6,118,820 | A | | 9/2000 | Reitmeier et al. |
| 2003/0202589 | A1 | | 10/2003 | Reitmeier et al. |

FOREIGN PATENT DOCUMENTS

| JP | 6 30392 | 2/1994 |
| JP | 6-30392 | 2/1994 |
| JP | 6 217274 | 8/1994 |
| JP | 6-217274 | 8/1994 |
| JP | 11 252372 | 9/1999 |
| JP | 11-252372 | 9/1999 |

(Continued)

OTHER PUBLICATIONS

European Search Report issued Aug. 20, 2010 in PCT/JP05/008094 filed Apr. 21, 2005.

*Primary Examiner* — Brian Q Le
*Assistant Examiner* — Ruiping Li
(74) *Attorney, Agent, or Firm* — Oblon, Spivak, McClelland, Maier & Neustadt, L.L.P.

(57) ABSTRACT

A simple compression and decompression method provides excellent effects by reducing the storage capacity of an image memory, while adapting to the properties of image.

On the basis of luminance information extracted by a luminance extraction block 110, a compression conversion rule setting block 120 sets a compression conversion rule to a compression conversion table 130. In accordance with this compression conversion rule, an image compression block 140 compresses original image data and holds the compressed image data in an image memory 150 along with a type of the compression conversion rule. This type of the compression conversion rule held in the image memory 150 is extracted by a decompression conversion rule setting block 160. In accordance with this type, a decompression conversion rule is set to a decompression conversion table 170. In accordance with the decompression conversion rule set to the decompression conversion table 170, an image decompression block 180 decompresses the compressed image data held in the image memory 150.

17 Claims, 15 Drawing Sheets

(56) References Cited

FOREIGN PATENT DOCUMENTS

| | | |
|---|---|---|
| JP | 2001-94788 | 4/2001 |
| JP | 2001 94788 | 4/2001 |
| JP | 2002-542739 | 12/2002 |
| JP | 2002 542739 | 12/2002 |
| JP | 2003 274178 | 9/2003 |
| JP | 2003-274178 | 9/2003 |

\* cited by examiner

FIG.4

| 131 | 132 |
|---|---|
| 00 0000 0000 0000 | 0000 0000 |
| 00 0000 0000 0001 | 0000 0001 |
| 00 0000 0000 0010 | 0000 0010 |
| 00 0000 0000 1000 | 0000 1000 |
| 00 0000 0001 0000 | 0000 0101 |
| ⋮ | ⋮ |
| 00 0001 0000 0000 | 0010 0000 |
| ⋮ | ⋮ |
| 11 1111 1111 1111 | 1111 1110 |

FIXED AREA (rows above the variable boundary)

VARIABLE AREA (rows below)

130

IMAGE PROCESSING DEVICE

TECHNICAL FIELD

The present invention relates generally to an image processing apparatus and, more particularly, to an image processing apparatus for processing images taken with an image taking apparatus, such as a digital still camera, and an image taking apparatus containing the above-mentioned image processing apparatus, an image processing method, and a program for making a computer execute the above-mentioned image processing method.

BACKGROUND ART

With an image taking apparatus, such as a digital still camera, pressing the shutter causes the capturing of a still image. The taken original image data is subjected to internal signal processing, such as imaged signal processing and encode processing, and the resultant processed data is recorded to a detachable recording media for example. In this process, the taken original image data is temporarily held in an image memory before being subjected to internal signal processing. This image memory, formed by a DRAM (Dynamic Random Access Memory) or an SDRAM (Synchronous DRAM), has come to require a larger storage capacity prompted by the recent technologies of packing the greater number of pixels, but at the expense of increased hardware cost and power dissipation.

Therefore, with conventional image taking apparatuses, the taken original image data is compressed before being stored in the image memory. The compressed data is read from the image memory and decompressed to be subjected to later processing. For example, an image processing circuit is proposed (Japanese Patent Laid-Open No. 2002-111989 (FIG. 3) for example) in which the original image data is compressed by executing an entropy encoding processing such as binary arithmetic coding and Huffman coding on a difference value between two nearby pixels. In the conventional technique described above, the correlation between nearby pixels is used to reduce the amount of data to be stored in the image memory. The correlation between pixels is obtained by executing hardware or software processing; in the hardware approach, an entropy encoding processing circuit must be separately prepared, while the software approach presents a problem of making the processing time longer due to the packing of increasing number of pixels.

It is therefore an object of the present invention to provide a compression and decompression technique that is simpler than conventional equivalent but significantly reduces the required storage size of the image memory.

DISCLOSURE OF INVENTION

In carrying out the invention and according to one embodiment thereof, there is provided, as recited in claim 1, an image processing apparatus including: conversion rule holding means for holding a conversion rule for original image data taken by an imaging device; luminance extraction means for extracting luminance information associated with the original image data; conversion rule setting means for setting the conversion rule on the basis of the luminance information and holding the conversion rule to the conversion rule holding means; and image conversion means for converting the original image data in accordance with the conversion rule held in the conversion rule holding means.

The above-mentioned configuration provides a function of adaptively converting original image data on the basis of the luminance information associated with original image data.

In carrying out the invention and according to another embodiment thereof, there is provided an image processing apparatus including: compression conversion rule holding means for holding a compression conversion rule for original image data taken by an imaging device; luminance extraction means for extracting luminance information associated with the original image data; compression conversion rule setting means for setting the compression conversion rule in the compression conversion rule holding means in accordance with the luminance information; image compression means for compressing the original image data into compressed image data in accordance with the compression conversion rule held in the compression conversion rule holding means; an image memory for holding the compressed image data along with a type of the compression conversion rule; decompression conversion rule holding means for holding a decompression conversion rule for the compressed image data; decompression conversion rule setting means for extracting the type held in the image memory and setting the decompression conversion rule in the decompression conversion rule holding means on the basis of the type; image decompression means for decompressing the compressed image data into decompressed image data in accordance with the decompression conversion rule held in the decompression conversion holding means; and signal processing means for executing predetermined signal processing on the decompressed image data.

The above-mentioned configuration provides a function of adaptively converting original image data on the basis of the luminance information associated with the original image data, holding the converted image data in the image memory, and then decompressing the image data held in the image memory, thereby executing signal processing on the decompressed image data.

In the image processing apparatus recited in claim 3, the compression conversion rule holding means has a fixed area for holding the compression conversion rule in a fixed manner and a variable area that is set in accordance with the luminance information by the compression conversion rule setting means, in the image processing apparatus according to claim 2. The above-mentioned configuration provides a function of adaptively converting the original image data on the basis of the luminance information associated with the original image data in the variable area, while eliminating the necessity for resetting the compression conversion rules in the fixed area.

The image processing apparatus recited in claim 4 further includes: pointer hold means for holding a pointer for the variable area of the compression conversion rule holding means; and decision means for deciding a type of the compression conversion rule in accordance with the luminance information thereby setting the pointer in the image processing apparatus according to claim 3. This configuration provides a function of making the variable area accessible by use of the pointer corresponding to the type of the compression conversion rule decided on the basis of the luminance information associated with the original image data.

In the image processing apparatus recited claim 5, the decompression conversion rule holding means has a fixed area for holding the decompression conversion rule in a fixed manner and a variable area that is set on the basis of the type of the compression conversion rule by the decompression conversion rule setting means in the image processing apparatus according to claim 2. This configuration provides a function of decompressing the image data adaptively converted at the time of compression in the variable area, while eliminating the necessity for resetting the decompression conversion rule in the fixed area.

The image processing apparatus recited in claim 6 further includes: pointer holding means for holding a pointer for the variable area of the decompression conversion rule holding means. The pointer is set on the basis of the type held in the image memory in the image processing apparatus according to claim 5.

This configuration provides a function of making the variable area accessible by use of the pointer corresponding to the type of the compression conversion rule held in the image memory.

In the image processing apparatus recited in claim 7, the compression conversion rule setting means sets the compression conversion rule within a blanking interval in the imaging device in the image processing apparatus according to claim 2. This configuration provides a function of setting the compression conversion rule by use of the interval in which a valid image is not taken by the imaging device.

In the image processing apparatus recited in claim 8, the compression conversion rule setting means sets the compression conversion rule on an image frame basis in the image processing apparatus according to claim 2. This configuration provides a function of realizing compression conversion by a compression conversion rule suitable for each image frame.

In the image processing apparatus recited in claim 9, the compression conversion rule setting means sets the compression conversion rule on a predetermined image block basis in the image processing apparatus according to claim 2. This configuration provides a function of realizing compression conversion by a compression conversion rule suitable for each image block.

In the image processing apparatus recited in claim 10, the image compression means compresses the original image data by executing predetermined interpolation on the compression conversion rule held in the compression conversion rule holding means in the image processing apparatus according to claim 2. This configuration provides a function of reducing the storage capacity for a compression conversion rule held in the compression conversion rule holding means.

In the image processing apparatus recited in claim 11, the image decompression means decompresses the compressed image data by executing predetermined interpolation on the decompression conversion rule held in the decompression conversion rule holding means in the image processing apparatus according to claim 2. This configuration provides a function of reducing the storage capacity for a decompression conversion rule held in the decompression conversion rule holding means.

In carrying out the invention and according to another embodiment thereof, there is provided, recited in claim 12, an image taking apparatus including: image taking means for taking an image; a front end for converting the taken image into original image data; compression conversion rule holding means for holding a compression conversion rule for the original image data; luminance extraction means for extracting luminance information associated with the original image data; compression conversion rule setting means for setting the compression conversion rule in the compression conversion rule holding means in accordance with the luminance information; image compression means for compressing the original image data into compressed image data in accordance with the compression conversion rule holding means; an image memory for holding the compressed image data along with a type of the compression conversion rule; decompression conversion rule holding means for holding a decompression conversion rule for the compressed image data; decompression conversion rule setting means for extracting the type held in the image memory and setting the decompression conversion rule in the decompression conversion rule holding means in accordance with the type; image decompression means for decompressing the compressed image data into decompressed image data in accordance with the decompression conversion rule held in the decompression conversion rule holding means; signal processing means for executing predetermined signal processing on the decompressed image data; and image recording means for holding the signal-processed image data into a recording media.

This configuration provides a function of adaptively converting original image data on the basis of luminance information associated with the original image data, holding the converted image data in the image memory, decompressing the image data held in the image memory, executing signal processing on the decompressed image data, and holding the signal-processed image data in a recording media.

In carrying out the invention and according to still another embodiment thereof, there is provided an image processing method, as recited in claim 13, for an image processing apparatus having a compression conversion rule holding means for holding a compression conversion rule for original image data taken by an imaging device, an image memory for holding compressed image data obtained by compressing the original image data, and decompression conversion rule holding means for holding a decompression conversion rule for the compressed image data, the image processing method including: an extraction procedure for extracting luminance information associated with the original image data; a setting procedure for setting the compression conversion rule in the compression conversion rule holding means in accordance with the luminance information; a compression procedure for compressing the original image data into the compressed image data in accordance with the compression conversion rule held in the compression conversion rule holding means; a storage procedure for storing the compressed image data into the image memory along with a type of the compression conversion means; a reading procedure for reading data from the image memory; a setting procedure for extracting, if the read data is a predetermined identifier, the type and setting the decompression conversion rule in the decompression conversion rule holding means on the basis of the type; a decompression procedure for decompressing, if the read data is the compressed image data, the compressed image data into decompressed image data in accordance with the decompression conversion rule held in the decompression conversion rule holding means; and a signal processing procedure executing predetermined signal processing on the decompressed image data. This configuration provides a function of adaptively converting original image data on the basis of luminance information associated with the original image data, holding the converted image data in the image memory, decompresses the image data held in the image memory, and executes signal processing on the decompressed image data.

In carrying out the invention and according to yet another embodiment thereof, there is provided a program, as recited in claim 14, for making an image processing apparatus having a compression conversion rule holding means for holding a compression conversion rule for original image data taken by an imaging device, an image memory for holding compressed image data obtained by compressing the original image data, and decompression conversion rule holding means for holding a decompression conversion rule for the compressed image data execute: an extraction procedure for extracting luminance information associated with the original image data; a setting procedure for setting the compression conversion rule in the compression conversion rule holding means in accordance with the luminance information; a compression procedure for compressing the original image data into the compressed image data in accordance with the compression conversion rule held in the compression conversion rule holding means; a storage procedure for storing the compressed image data into the image memory along with a type of the compression conversion means; a reading procedure for reading data from the image memory; a setting procedure for extracting, if the read data is a predetermined identifier, the type and setting the decompression conversion rule in the decompression conversion rule holding means on the basis of the type; a decompression procedure for decompressing, if the read data is the compressed image data, the compressed image data into decompressed image data in accordance with the decompression conversion rule held in the decompression conversion rule holding means; and a signal processing procedure executing predetermined signal processing on the decompressed image data. This configuration provides a function of adaptively converting original image on the basis of luminance information associated with the original image data, holding the converted image data in the image memory, decompressing the image data held in the image memory, and executing signal processing on the decompressed image data.

BRIEF DESCRIPTION OF DRAWINGS

FIG. 4 is a diagram illustrating one example of a compression conversion table 130 practiced as yet another embodiment of the invention.

BEST MODE FOR CARRYING OUT THE INVENTION

This invention will be described in further detail by way of example with reference to the accompanying drawings.

Figure 1:
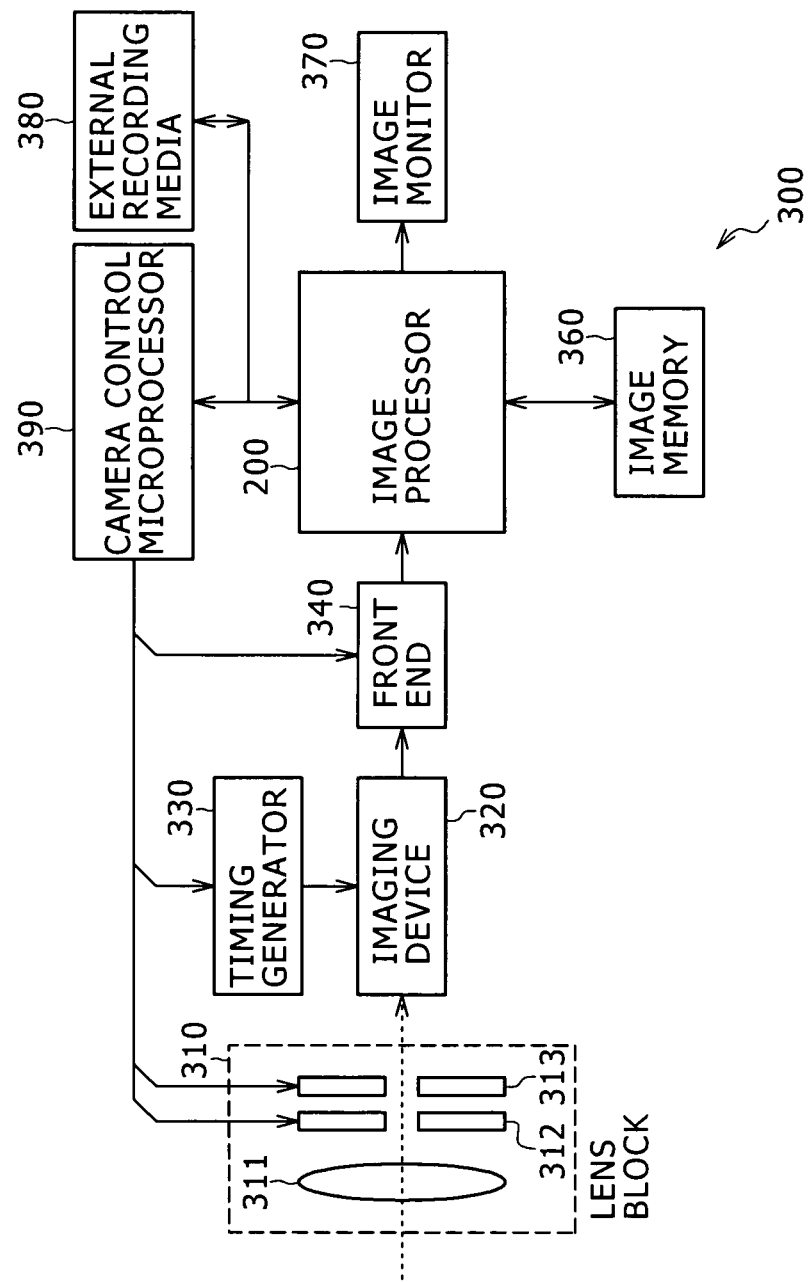
FIG. 1 is a block diagram illustrating one example of an image taking apparatus 300 practiced as one embodiment of the invention.

Now, referring to FIG. 1, there is shown an exemplary configuration of an image taking apparatus 300 practiced as one embodiment of the invention.

The image taking apparatus 300 is configured by a lens block 310, an imaging device 320, a timing generator 330, a front end 340, an image processor 200, an image memory 360, an image monitor 370, an external recording media 380, and a camera control microprocessor 390.

The lens block 310 collects the light emitted from a subject and has a lens 311, an aperture diaphragm 312, and a shutter 313. The aperture diaphragm 312 controls the amount of light by limiting the passing of light. It is also practicable that the aperture diaphragm 312 also functions as the shutter 313. The aperture diaphragm 312 and the shutter 313 are controlled by the camera control microprocessor 390.

The imaging device 320 is an image sensor, based on the CCD (Charge Coupled Devices) or the CMOS (Complementary Metal Oxide Semiconductor sensor), and converts the optical information of a subject into an electrical signal. On the surface of the sensor, a plurality of color filters is disposed to identify different colors. The timing generator 330 drives the imaging device 320 horizontally and vertically. The timing generator 330 also executes the exposure control of a high-speed/low-speed electronic shutter and so on.

This timing generator 330 is controlled by the camera control microprocessor 390.

The front end 340 converts an analog signal outputted from the imaging device 320 into a digital signal. Executed in the front end 340 are correlation square sampling for picking electrical signal out by removing noise component in the imaging device 320, gain control for correcting the upper and lower levels, and A/D conversion for converting an analog signal into a digital signal. The front end 340 is controlled by the camera control microprocessor 390.

The image processor 200 executes various digital signal processing operations on the basis of digitally converted image data supplied from the imaging device 320, thereby generating a luminance signal, a chrominance signal, and so on. The image processor 200 also has a capability of encoding image data into a predetermined file format, such as JPEG (Joint Photographic Experts Group).

The image memory 360 is a storage element for temporarily storing image data at the signal processing by the image processor 200 and based on DRAM (Dynamic Random Access Memory) or SDRAM (Synchronous DRAM) for example.

The image monitor 370 allows the user to check an image (or a through-image) taken by the imaging device 320 and is based on a LCD (Liquid Crystal Display) panel for example. The external recording media 380 stores image data and often uses a flash memory as a rewritable nonvolatile memory.

The camera control microprocessor 390 controls the image taking apparatus 300 in its entirety; to be more specific, the camera control microprocessor 390 controls the exposure in the aperture diaphragm 312, the open/close of the shutter 313, the electronic shutter operation of the timing generator 330, the gain in the front end 340, and various modes and parameters in the image processor 200.

Figure 2:
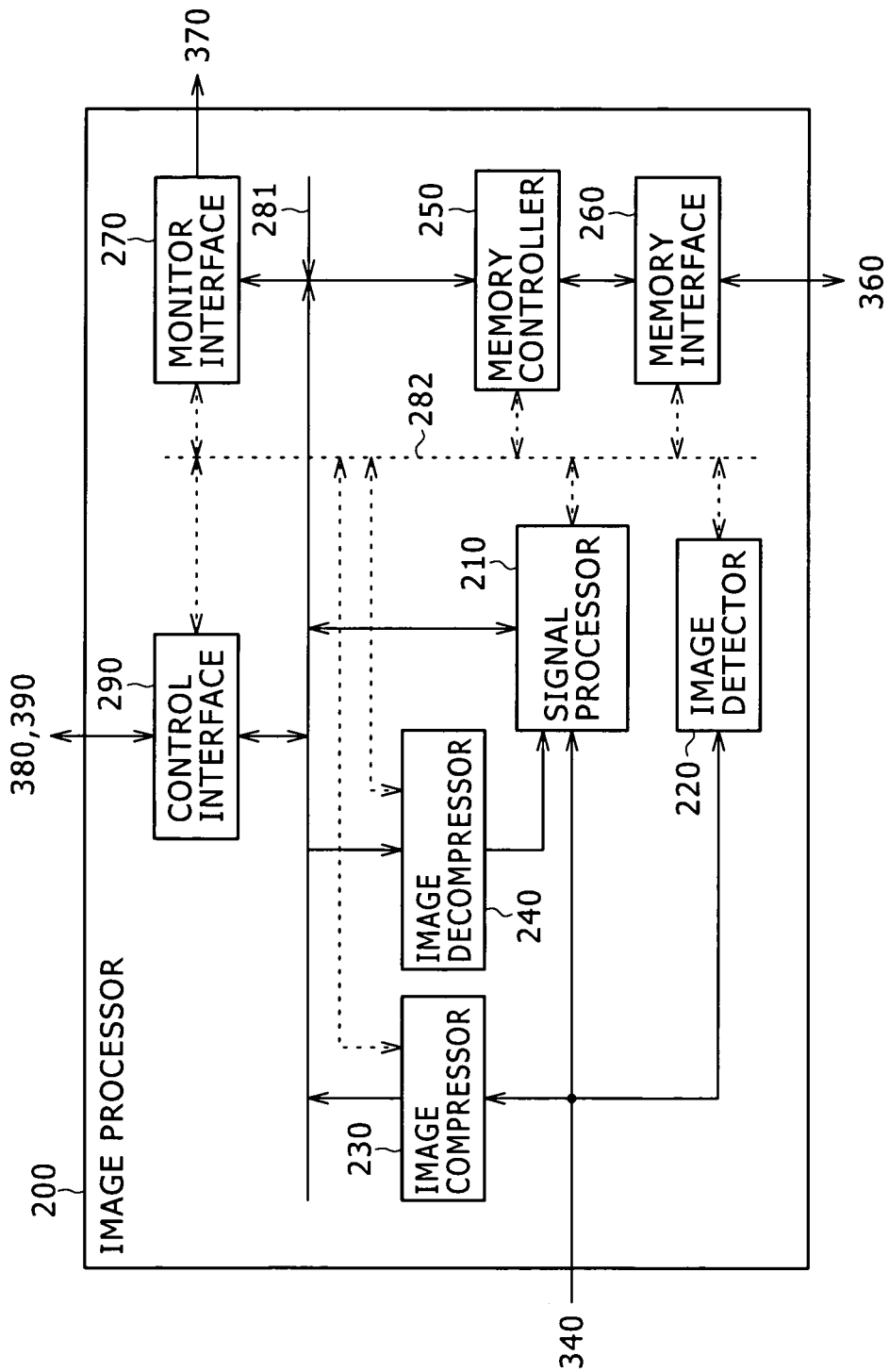
FIG. 2 is a block diagram illustrating an exemplary configuration of an image processor 200 practiced as another embodiment of the invention.

Referring to FIG. 2, there is shown an exemplary configuration of the image processor 200 practiced as one embodiment of the invention. The image processor 200 has a signal processor 210, an image detector 220, an image compressor 230, an image decompressor 240, a memory controller 250, a memory interface 260, and a monitor interface 270, a control interface 290. These components of the image processor 200 are interconnected with a data bus 281 and a control bus 282.

The signal processor 210 executes digital clamp, white balance, gamma correction, interpolation computation, filter computation, matrix computation, luminance generating computation, color generating computation, and other digital signal processing on the basis of original image information (or RAW data) digitized in the front end 340, thereby creating RGB values and then generating an image signal composed of luminance and color-difference signals. The signal processor 210 also generates image data encoded in a predetermined format, such as JPEG.

The image detector 220 detects a camera taken image that provides reference on which various camera control operations are based.

Signals to be detected by the image detector 220 include a detection signal associated with auto focus (AF) and a detection signal associated with automatic exposure (AE) control. The image detector 220 detects the edge component of luminance in an auto focus detection area set to a predetermined position on a taken image as a detection signal associated with auto focus and outputs a contrast value obtained by accumulating edge components. The image detector 220 detects the luminance in a detection area of the luminance set to a predetermined position on a taken image as a detection signal associated with automatic exposure control and outputs the luminance level.

In capturing a still image, the image compressor 230 compresses a captured image supplied from the front end 340. The resultant compressed image data is temporarily stored in the image memory 360 via the memory controller 250 and the memory interface 260. On the other hand, the image decompressor 240 decompresses the image data read from the image memory 360 for signal processing in the signal processor 210.

The memory controller 250 controls the transfer of image data between components of the image processor 200 and between these components and the image memory 360 and controls the data bus 281 on which data flows. The memory interface 260 transfers image data and compressed data with the image memory 360 that is used in the signal processing by the image processor 200. The monitor interface 270 converts image data into one of various display formats in order to display the image data on the image monitor 370. For example, an NTSC encoder is known for displaying image data onto an NTSC monitor. The control interface 290 transfers control data and image data between the camera control microprocessor 390 for controlling the image processor 200 and the image processor 200.

Figure 3:
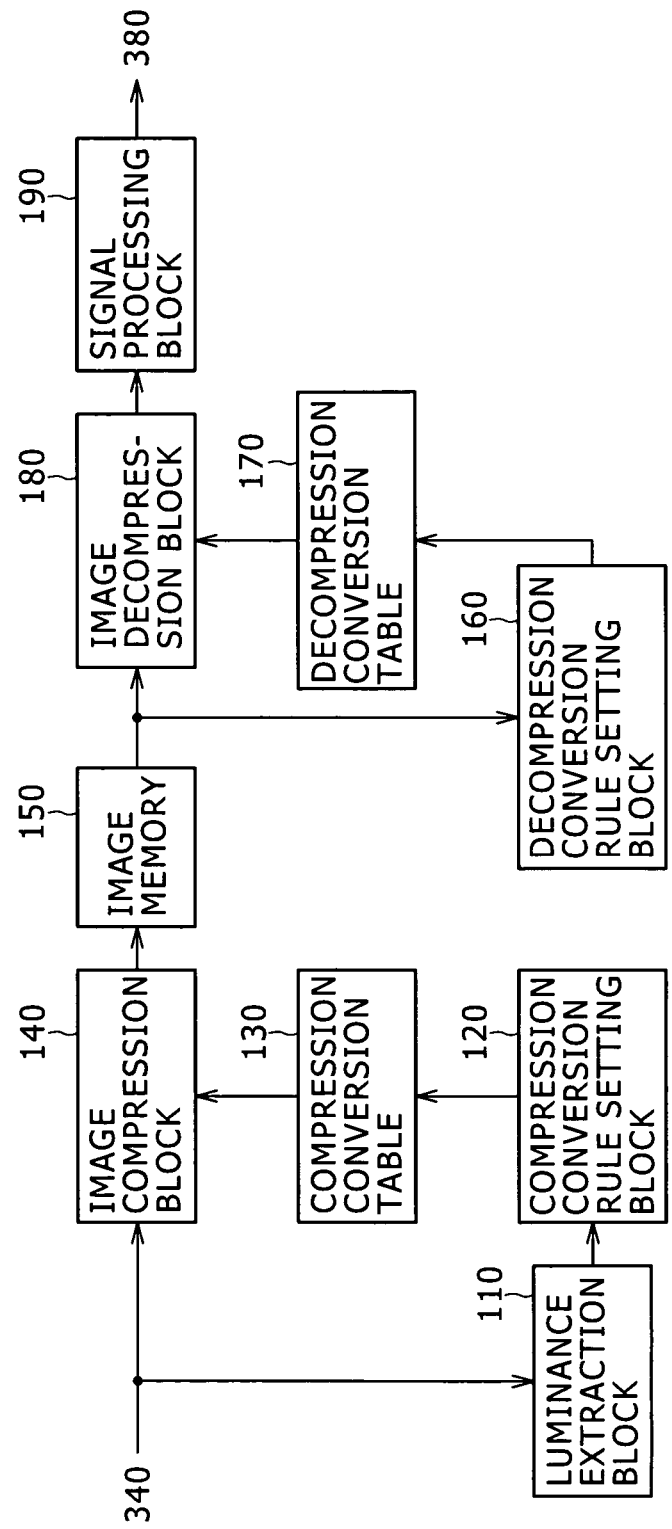
FIG. 3 is a block diagram illustrating one example of a functional configuration of an image processing apparatus practiced as still another embodiment of the invention.

Referring to FIG. 3, there is shown an exemplary functional configuration of an image processing apparatus practiced as another embodiment of the invention.

This image processing apparatus has a luminance extraction block 110, a compression conversion rule setting block 120, a compression conversion table 130, an image compression block 140, an image memory 150, a decompression conversion rule setting block 160, a decompression conversion table 170, an image decompression block 180, and a signal processing block 190. This image processing apparatus is implemented as the image processor 200 shown in FIG. 2, for example. However, the image memory 150 is implemented as the image memory 360 shown in FIG. 1, for example.

The luminance extraction block 110 extracts luminance information about the original image data from the front end 340. The luminance extraction block 110 may be available in a capability of automatic exposure control as with the image detector 220 shown in FIG. 2, for example.

The compression conversion rule setting block 120 sets a compression conversion rule to the compression conversion table 130 on the basis of the luminance information extracted by the luminance extraction block 110. This compression conversion rule is expressed by a data pair before and after compression conversion as will be described later. The compression conversion table 130 holds this compression conversion rule and is used by the image compression block 140 for compression conversion. The image compression block 140 compresses the original image data in accordance with the compression conversion rule held in the compression conversion table 130 and stores the compressed image data into the image memory 150. At this moment, the type of the compression conversion rule used for the compression conversion is stored in the image memory 150 as will be described later. It should be noted that the compression conversion table 130 and the image compression block 140 are implemented by the image compressor 230 for example; the compression conversion rule setting block 120 can be implemented by the image compressor 230 or the camera control microprocessor 390 for example.

The decompression conversion rule setting block 160 extracts the type of the compression conversion rule stored in the image memory 150 and sets a decompression conversion rule to the decompression conversion table 170 on the basis of the extracted type. This decompression conversion rule is expressed by a data pair before and after the decompression conversion as will be described later. The decompression conversion table 170 holds this decompression conversion rule and is used for the decompression conversion by the image decompression block 180. The image decompression block 180 decompresses the image data stored in the image memory 150 in accordance with the decompression conversion rule held in the decompression conversion table 170. It should be noted that the decompression conversion table 170 and the image decompression block 180 are implemented by the image decompressor 240 for example; the decompression conversion rule setting block 160 can be implemented by the image decompressor 240 or the camera control microprocessor 390 for example.

The signal processing block 190 executes various digital signal processing operations on the image data decompressed by the image decompression block 180 to generate an image signal. The generated image signal is recorded to the external recording media 380 for example in a predetermined format, such as JPEG. It should be noted that the signal processing block 190 can be implemented by the signal processor 210 for example.

Referring to FIG. 4, there is shown an exemplary configuration of the compression conversion table 130 in one embodiment of the invention. The compression conversion table 130 holds a set of conversion pairs of the pre-conversion data 131 and the post-conversion data 132 as a compression conversion rule. The image compression block 140 references the conversion pair in the compression conversion table 130 to execute compression conversion from pre-conversion data 131 to post-conversion data 132. It should be noted that, in FIG. 4, an example in which 14-bit pre-conversion data 131 is converted into 8-bit post-conversion data 132; it is also practicable to execute compression conversion of any other bit widths.

The compression conversion table 130 can be classified into a fixed area and a variable area. In the fixed area, each conversion pair is fixed and therefore cannot be rewritten during the course of image taking. On the other hand, in the variable area, each conversion pair is not fixed and therefore can be appropriately reset by the compression conversion rule setting block 120.

It should also be noted that, with the post-conversion data 132, a code ("11111111" in the example shown in FIG. 4) that is not allocated can be reserved for later use as an identifier as will be described later.

In FIG. 4, an exemplary configuration of the compression conversion table 130 is shown. The decompression conversion table 170 can employ substantially the same configuration except that the correlation is reversed. Namely, it is assumed that the image compression block 140 executes compression conversion from the pre-conversion data 131 having wider bit width into the post-conversion data 132 having narrower bit width in the compression conversion table 130; however, the image decompression block 180 executes conversion from data having narrower bit width (the post-conversion data 132 in the compression conversion table 130) into the data having wider bit width (the data 131 before conversion in the compression conversion table 130) in the decompression conversion table 170, thereby implementing the decompression conversion.

Figure 5:
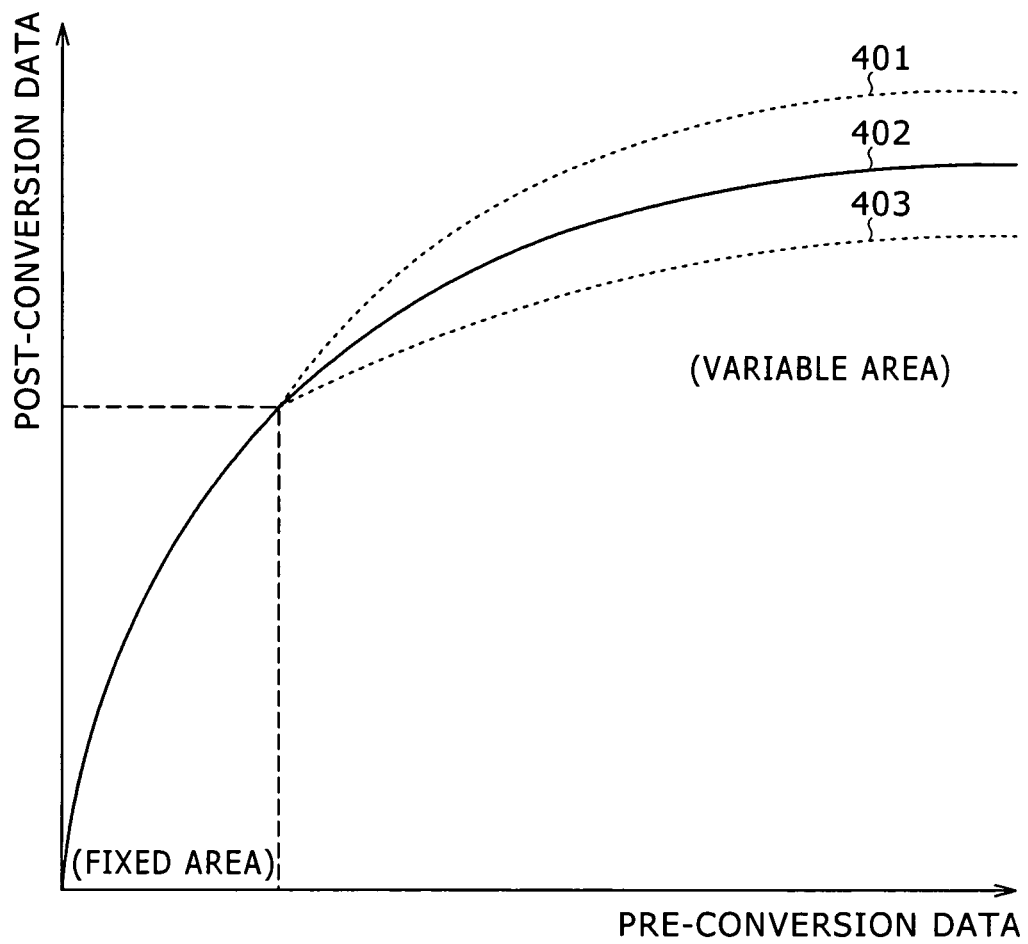
FIG. 5 is a diagram illustrating an overview of a compression conversion rule indicated by the above-mentioned compression conversion table 130.

Referring to FIG. 5, there is shown the outline of a compression conversion rule indicated by the compression conversion table 130 in one embodiment of the invention. The horizontal axis of this compression conversion rule is indicative of the pre-conversion data 131 and the vertical axis is indicative of the post-conversion data 132.

In this compression conversion rule, the fixed area and the variable area are shown as described with reference to FIG. 4. In the fixed area, a conversion pair is uniquely determined; in the variable area, a plurality of curves is determined. For example, if three conversion curves A (401), B (402), and C (403) are defined as a type of the compression conversion rule, conversion curve A (401) is employed if the luminance extracted by the luminance extraction block 110 is low, conversion curve B (402) is employed if the luminance is middle, and conversion curve C (403) is employed if the luminance is high. Namely, the type of compression conversion rule is adaptively selected in response to the extracted luminance and the selected compression conversion rule is set to the compression conversion table 130.

It should be noted that these conversion curves adaptively varies in accordance with luminance information; preferably, however, the conversion curves are basically like a γ (gamma) curve to be used in the signal processor 210 in the later stage.

Figure 6A:
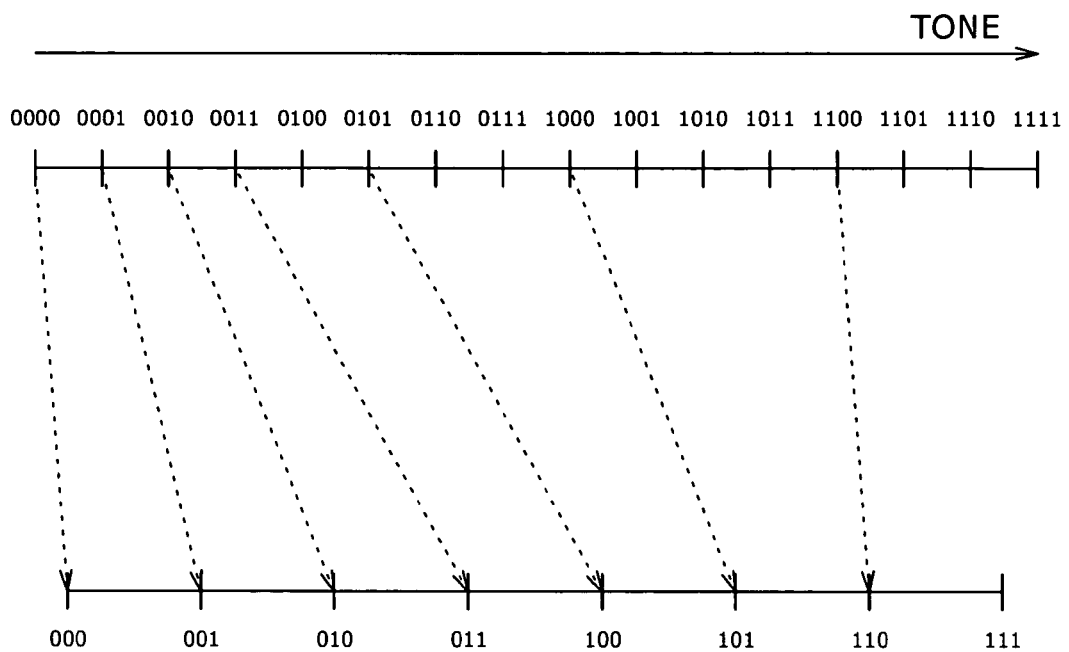
FIGS. 6A and 6B are diagrams illustrating specific examples of the compression conversion rule indicated by the above-mentioned compression conversion table 130.
Figure 6B:
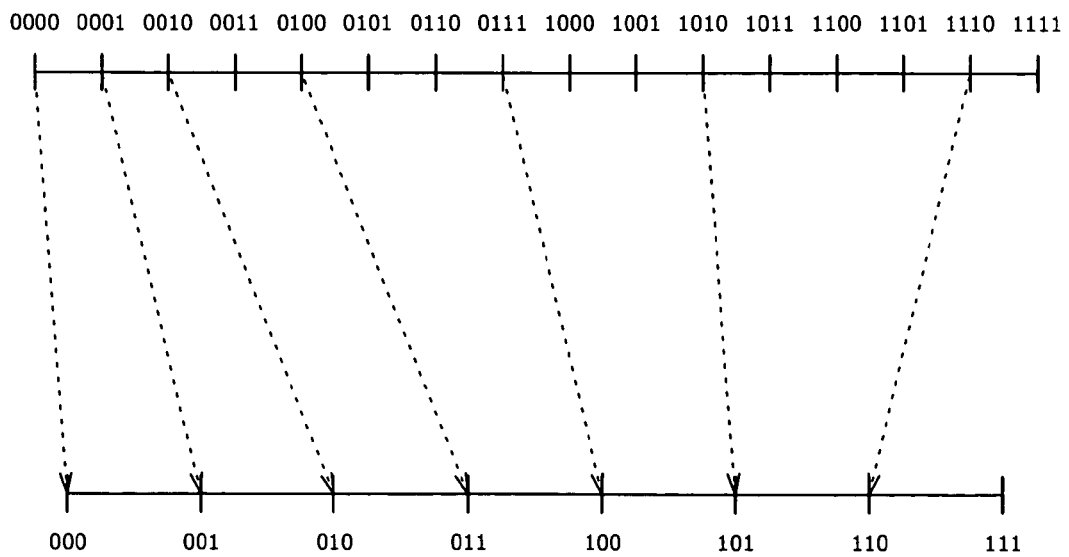

FIGS. 6A and 6B specifically show examples of the compression conversion rules indicated by the compression conversion table 130 in one embodiment of the invention. Here, for the brevity of description, an example is shown in which the 4-bit pre-conversion data 131 is converted into the 3-bit post-conversion data 132. Namely, in this example, 16-gray-scale image data is compressively converted into 8-gray-scale image data.

FIG. 6A shows a compression conversion rule in the case of comparatively low luminance. In this compression conversion rule, post-conversion sign bits are heavily allocated to lower portions of the pre-conversion 16 gray scales. This is done by use of a property in which, if the luminance is especially low, the human eye is sensitive to lower gray scales.

In contrast, FIG. 6B shows a compression conversion rule in the case of comparatively high luminance. In this compression conversion rule, comparatively many post-conversion sign bits are allocated to lower portions of pre-conversion 16 gray scales. As compared with the case of FIG. 6A, post-conversion sign bits are allocated also to higher portions of pre-conversion 16 gray scales. This is done by use of a property in which, if luminance is high, the human eye becomes less sensitive than when luminance is low.

The difference between these sign bit allocation methods is reflected by the difference between the types (401 through 403) of conversion curves shown in FIG. 5. Namely, if post-conversion sign bits are heavily allocated to pre-conversion lower gray scales as shown in FIG. 6A, a steeply rising curve, such as conversion curve A (401) shown in FIG. 5, is plotted. On the other hand, if post-conversion sign bits are allocated to pre-conversion higher gray scales as shown in FIG. 6B, a less steeply rising curve, such as curve C (403) shown in FIG. 5, is plotted.

Figure 7:
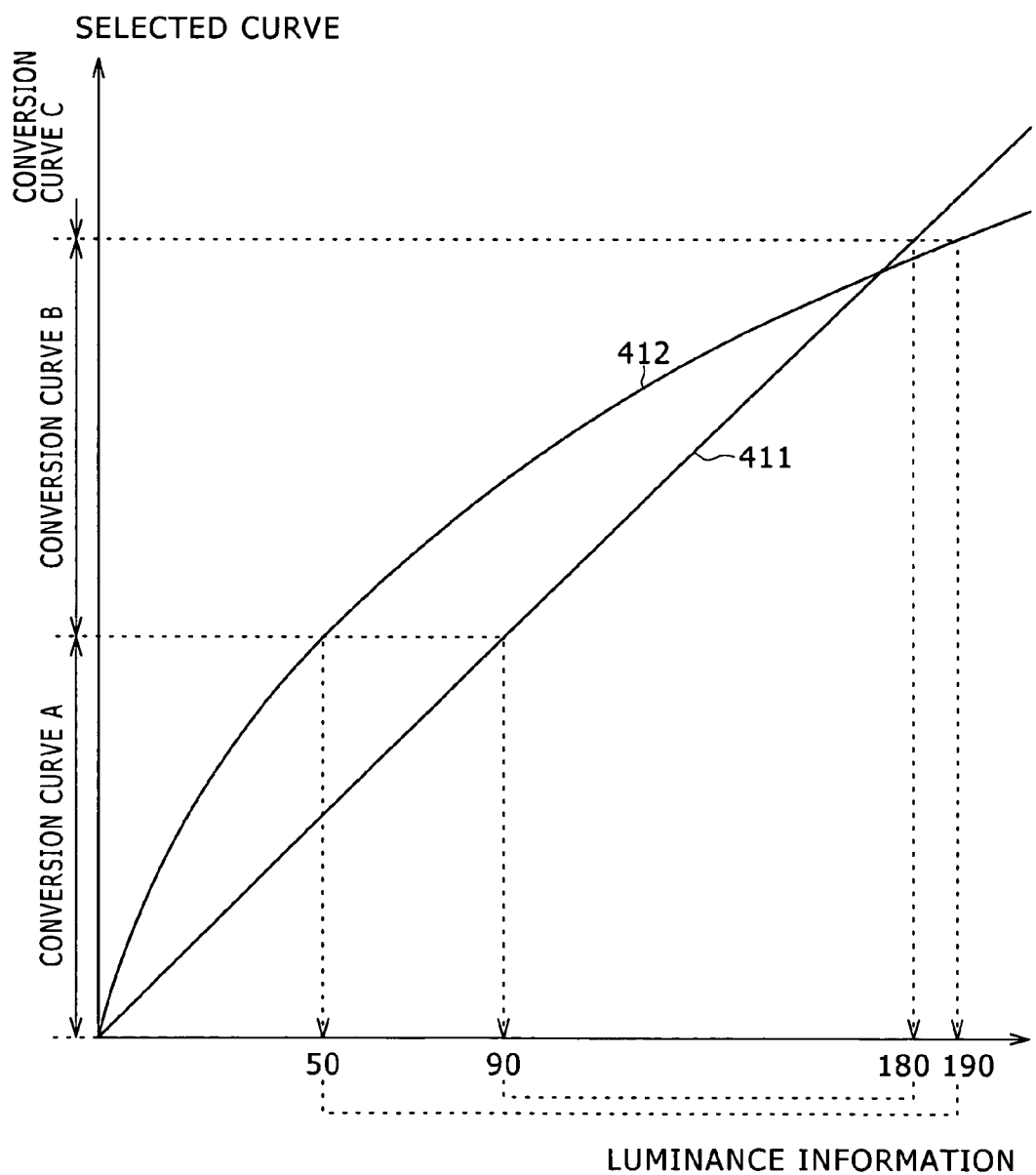
FIG. 7 is a diagram illustrating one example of the selection standard of a conversion curve by a compression conversion rule setting block 120 practiced as a different embodiment of the invention.

Referring to FIG. 7, there is shown one example of a standard of selecting conversion curves by the compression conversion rule setting block 120 in one embodiment of the invention. The horizontal axis of this selection standard is indicative of the luminance information extracted by the luminance extraction block 110 and the vertical axis is indicative of the type of a conversion curve to be selected.

If a graph 411 is selected as the selection standard, "190" and "180" provide thresholds for conversion curve selection as luminance information in this example. Consequently, it may be determined that, if the luminance information extracted by the luminance extraction block 110 is lower than "90," then conversion curve A (401) is selected; if the luminance information is "90" or higher and lower than "180," conversion curve B (402) is selected, and if the luminance information is "180" or higher, conversion curve C (403) is selected.

If a graph 412 is selected as the selection standard, "50" and "190" provides thresholds for conversion curve selection as luminance information. Consequently, it may be determined that, if the luminance information extracted by the luminance extraction block 110 is lower than "50," then conversion curve A (401) is selected; if the luminance information is "50" or higher and lower than "190," conversion curve B (402) is selected, and if the luminance information is "190" or higher, conversion curve C (403) is selected.

It should be noted that three types of conversion curves A through C are shown in FIGS. 5 and 7; it is also practicable to use any other number of types. In this case, the threshold value for luminance information is provided in accordance with the number of conversion curves.

Figure 8:
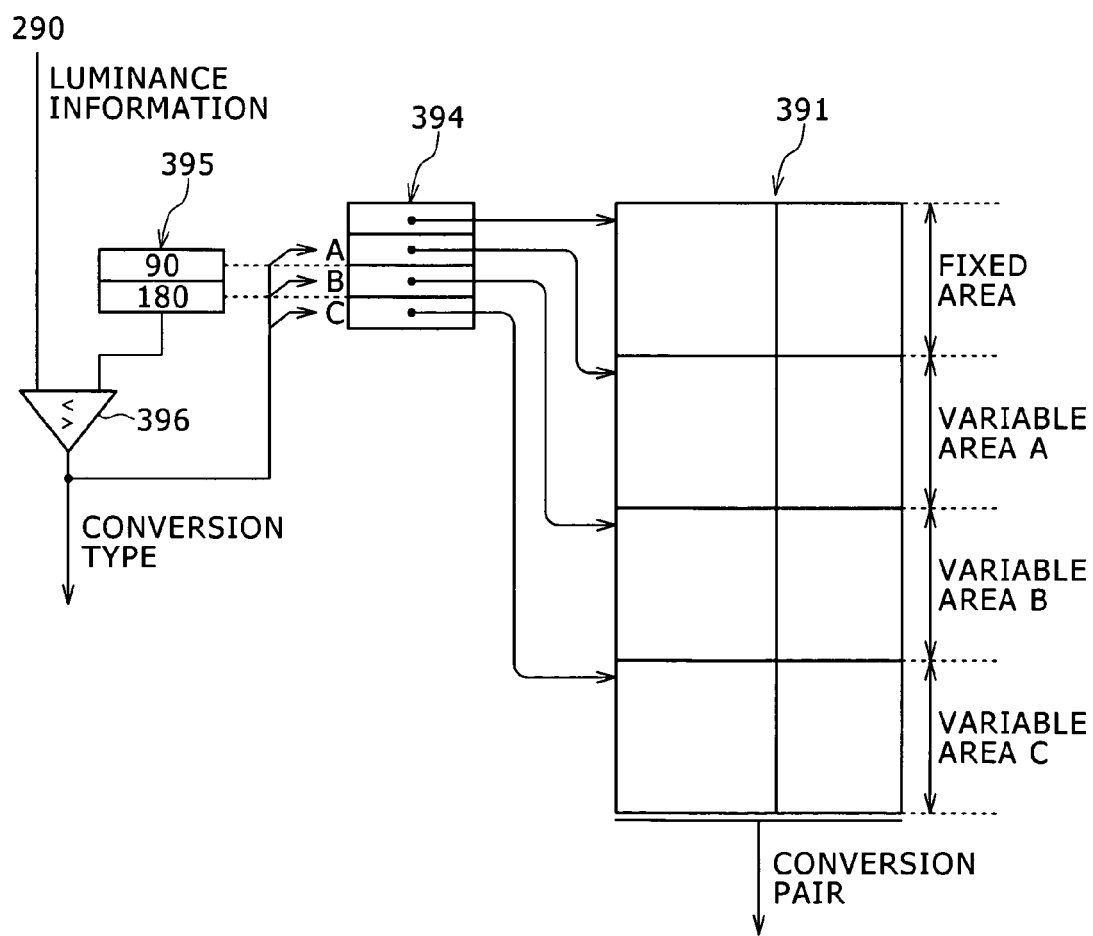
FIG. 8 is a diagram illustrating an exemplary configuration for setting a compression conversion rule practiced as a still different embodiment of the invention.

Referring to FIG. 8, there is shown an exemplary configuration for setting compression conversion rules in one embodiment of the invention. This exemplary configuration has a compression conversion table 391, a table pointer 394, a threshold register 395, and comparator 396.

The compression conversion table 391 holds compression conversion rules for a fixed area and all variable areas A through C. It is assumed that, in variable area A, conversion curve A be used; in variable area B, curve B be used; and, in variable area C, curve C be used. The start positions of the fixed area and each of the variable areas are indicated by the table pointer 394. For variable areas A through C, one of table pointers 394 is selected to identify the start position in the compression conversion table 391.

Thresholds for conversion curve selection are preset to the threshold register 395. For example, if the graph 411 shown in FIG. 7 is assumed to be the standard for selection, "90" and "180" are held in the threshold register 395 as luminance information. The comparator 396 compares the luminance information extracted by the luminance extraction block 110 with the thresholds held in the threshold register 395 to determine which conversion curve is to be selected or the compression conversion rule stored in which variable area is to be used. The result of this determination is outputted as a type of compression conversion rule (or conversion type).

A configuration for setting the above-mentioned compression conversion rules can be implemented by the camera control microprocessor 390 shown in FIG. 1 for example. In this case, the luminance information extracted by the image detector 220 shown in FIG. 2 is supplied to the control interface 290 via the control bus 282 and then to the comparator 396 at on an input terminal thereof. Next, a conversion pair outputted from the compression conversion table 391 is supplied to the control interface 290 again to be set to the compression conversion table 130 in the image compressor 230 via the control bus 282. Consequently, the compression conversion by the image compressor 230 is enabled. It should be noted that the fixed area may be stored in the ROM in the image compressor 230 or transferred to the image compressor 230 before image taking; therefore, there is no need for supplying conversion pairs in accordance with the luminance information to the fixed area.

The above-mentioned configuration for setting compression conversion rules can be arranged in the image processor 200 shown in FIG. 2 for example. Namely, instead of supplying conversion pairs from the camera control microprocessor 390, all conversion pairs may be held in the image compressor 230, thereby switching between areas to be used of the compression conversion table 391 on the basis of the luminance information extracted by the image detector 220.

Figure 9:
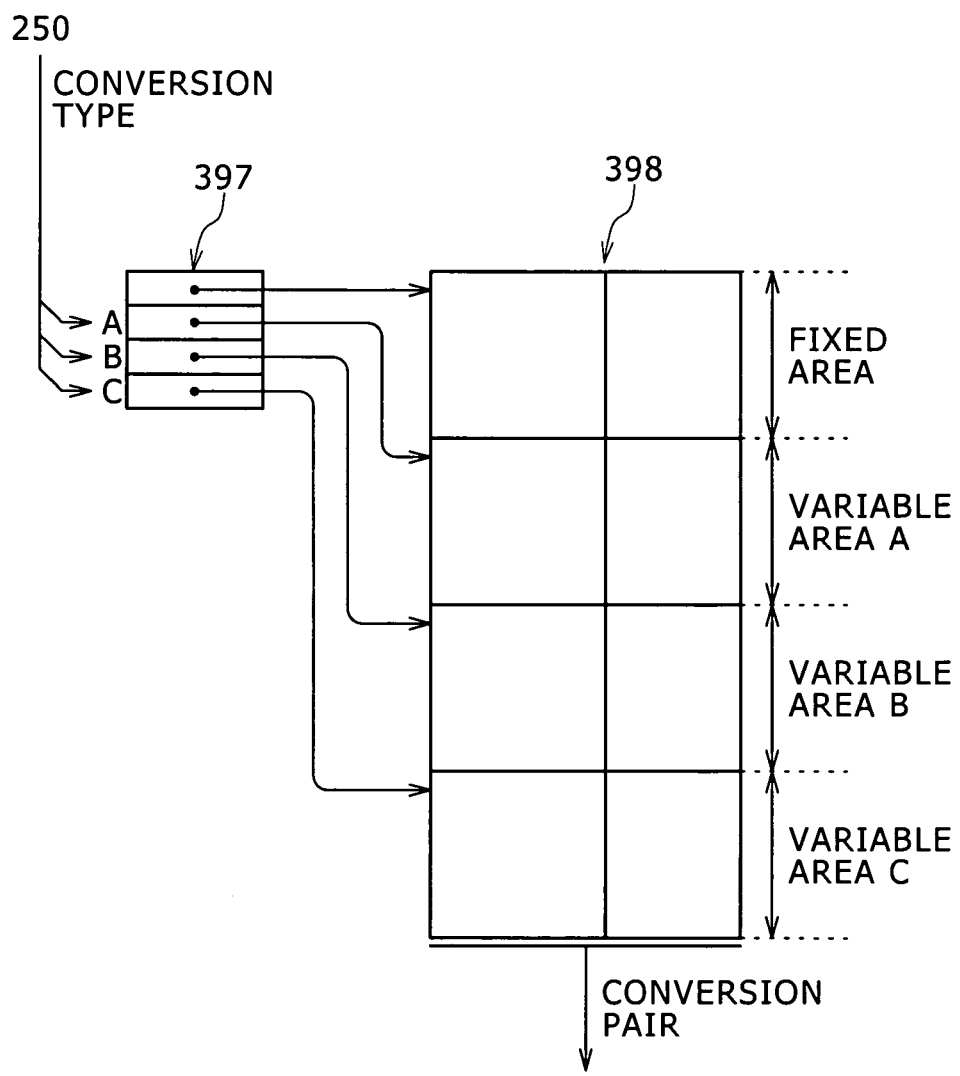
FIG. 9 is a diagram illustrating an exemplary configuration for setting a decompression conversion rule practiced as a yet different embodiment of the invention.

Referring to FIG. 9, there is shown an exemplary configuration for setting decompression conversion rules in one embodiment of the invention. This configuration has a decompression conversion table 398 and a table pointer 397.

As with the compression conversion table 391 shown in FIG. 8, the decompression conversion table 398 holds compression conversion rules for a fixed area and all variable areas A through C. The start positions of the fixed area and each of the variable areas are indicated by the table pointer 397. For variable areas A through C, one of table pointers 397 is selected to identify the start position in the decompression conversion table 398. The selection of the table pointer 397 is executed on the basis of the type (or conversion type) of the compression conversion rule extracted from the image memory 360.

The above-mentioned configuration for setting decompression conversion rules can be implemented by the camera control microprocessor 390 shown in FIG. 1 for example. In this case, the conversion type extracted from the image memory 360 is transferred to the memory controller 250 via the memory interface 260 and then to the table pointer 397 via the control bus 282 and the control interface 290. Next, a conversion pair outputted from the decompression conversion table 398 is supplied to the control interface 290 again to be set to the decompression conversion table 170 in the image decompressor 240 via the control bus 282. Consequently, the decompression conversion in the image decompressor 240 is enabled.

This configuration for setting decompression conversion rules may also be arranged in the image processor 200 shown in FIG. 2 for example. Namely, instead of supplying conversion pairs from the camera control microprocessor 390, all conversion pairs may be held in the image decompressor 240, thereby switching between areas to be used of the decompression conversion table 398 on the basis of the conversion type extracted from the image memory 360.

Figure 10A:
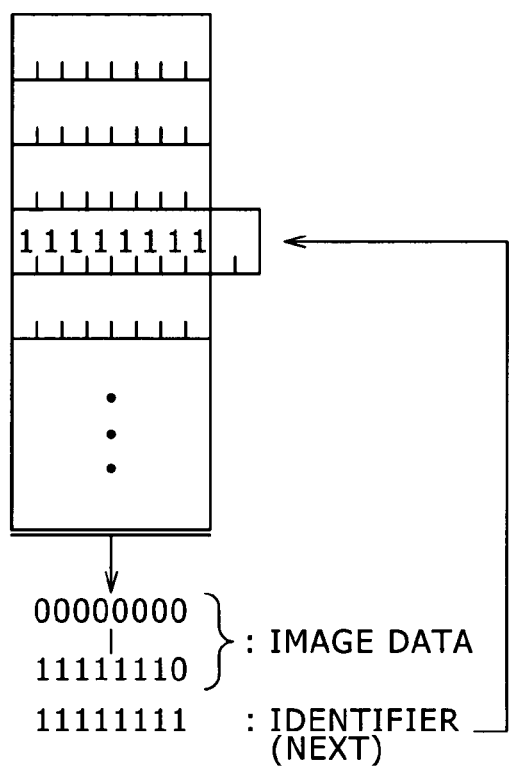
FIGS. 10A and 10B are diagrams illustrating examples of a stored data format in an image memory 360 practiced as one embodiment of the invention.
Figure 10B:
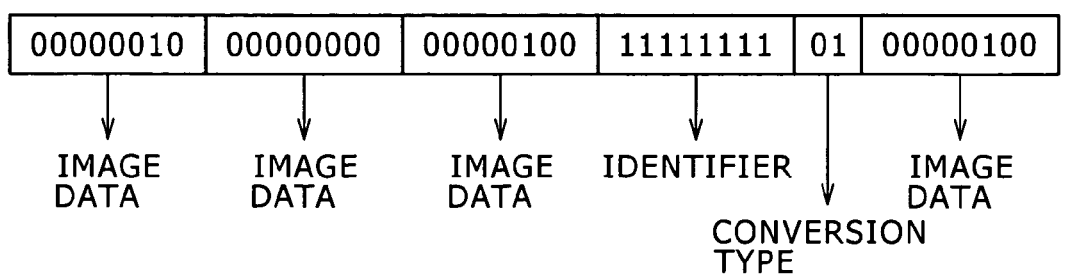

FIGS. 10A and 10B show one example of a storage data format in the image memory 360 in one embodiment of the invention. The image data to be stored in the image memory 360 is image data compressed by the image compression block 140 and has an 8-bit width for example. As shown in FIG. 10A, each piece of image data takes any of values "00000000" through "11111110." It should be noted however that "11111111" is reserved as an identifier and therefore not used as image data. In other words, if identifier "11111111" is detected in stored data, it indicates that the conversion type is stored immediately after this identifier.

To be more specific, as shown in FIG. 10B, if a value other than "11111111" is stored, the image data is recognized as compressed image data; if value "11111111" is stored, the value immediately thereafter (two bits in this example) is recognized as conversion type. For example, if conversion type is "01," it indicates that conversion curve A has been selected as compression conversion rule; if conversion type is "10," it indicates that conversion curve B has been selected as compression conversion rule; and, if conversion type is "11," it indicates that conversion curve C has been selected as compression conversion rule.

If this conversion type is stored, it indicates that the subsequence image data is compressed in accordance with that conversion type. Therefore, if this image data is decompressed by the image decompression block 180, it is necessary to follow that conversion type.

Figure 11:
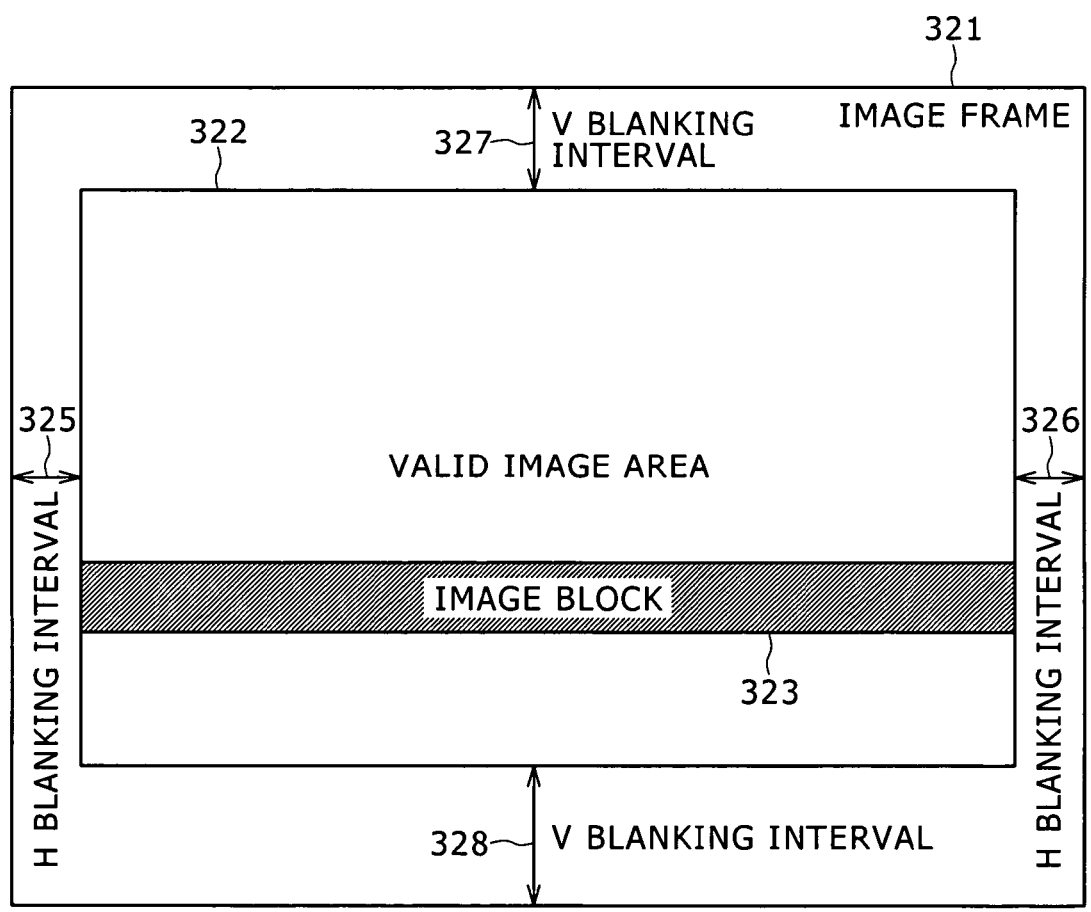
FIG. 11 is a diagram illustrating one example of an image frame 321 of an imaging device 320 practiced as another embodiment of the invention.

Referring to FIG. 11, there is shown one example of an image frame 321 in the imaging device 320 in one embodiment of the invention. In the image frame 321, a valid image area 322 is an area that becomes valid in the image frame 321, providing a recorded image area at the time of image taking. The interval equivalent to the area outside this valid image area 322 is called a blanking interval that is used for the signal processing in the signal processor 210. The blanking interval is largely divided into horizontal H blanking intervals 325 and 326 and vertical V blanking intervals 327 and 328.

Luminance information is detected realtime by the image detector 220 and, on the basis of the detected luminance information, the compression conversion rule and the decompression conversion rule are set to the compression conversion table 130 and the decompression conversion table 170 respectively during the above-mentioned blanking interval. At the time of still image taking, the compression conversion rule and the decompression conversion rule for the captured image are set on the basis of the luminance information detected in the through-image.

This setting of compression conversion rule and decompression conversion rule may be executed for each image frame 321 or for each of some image blocks 323 in the image frame 321. For example, with 5-million-pixel image data, an image size of horizontal 3600 pixels times vertical 1970 lines; it is also practicable to set the compression conversion rule by determining the luminance information for every 20 lines that form the image block 323. Because, in outdoor image taking, several upper lines in one frame may be a high luminance area, such as the sky, it is often effective to change conversion curves for every image block 323 as described above.

Figure 12:
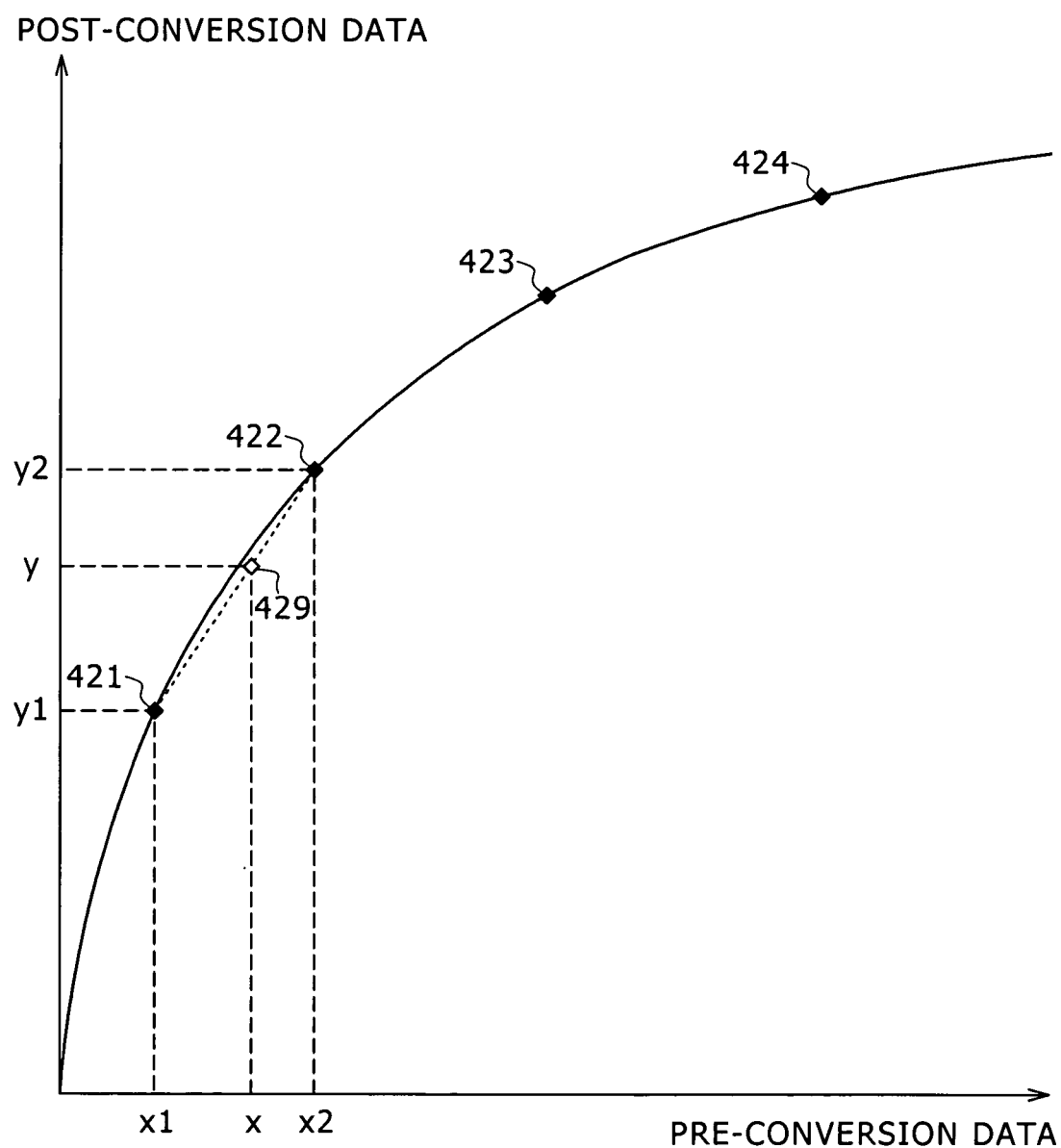
FIG. 12 is a diagram illustrating one example of interpolation processing by an image compression block 140 practiced as still another embodiment of the invention.

Referring to FIG. 12, there is shown one example of interpolation processing by the image compression block 140 in one embodiment of the invention. The compression conversion table 130 plots conversion curves as shown in FIG. 5; however, all points need not always be held in the compression conversion table 130. For example, as shown in FIG. 12, only discrete representative points 421 through 424 may be held in the compression conversion table 130 as a conversion pair, the other points being obtained by interpolation processing.

For one example of this interpolation processing, if pre-conversion data x is given, it is considered, in order to obtain corresponding post-conversion data y, linear interpolation point 429 is computed from representative points 421 and 422. Here, let pre-conversion data of representative point 421 be x1, post-conversion data be y, pre-conversion data of representative point 422 be x2 and post-conversion data be y2, then post-conversion data y of linear interpolation point 429 is obtained by any one of following equations:

$$y=(y2-y1)/(x2-x1) \times (x-x2)+y2$$

$$y=(y2-y1)/(x2-x1) \times (x-x1)+y1$$

It should be noted that, in the above, linear interpolation is used as an example; however, post-conversion data may be obtained by other nonlinear interpolation processing. In the example shown in FIG. 12, the interpolation processing at the compression conversion in the image compression block 140 is shown; this is also applicable by generally the same technique to the interpolation processing for the decompression conversion in the image decompression block 180.

The following describes an operation of the image taking apparatus 300 in one embodiment of the invention with reference to accompanying drawings.

Figure 13:
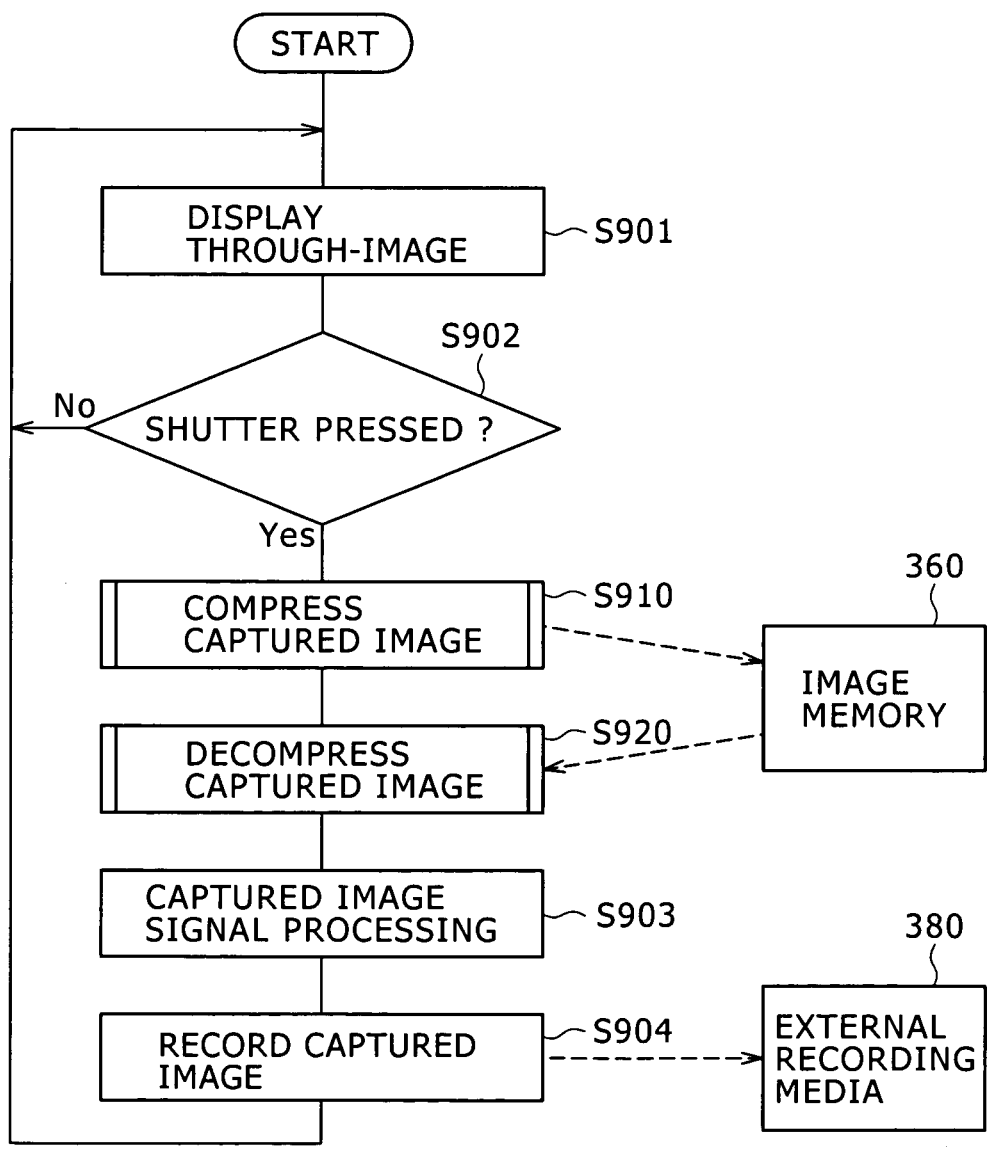
FIG. 13 is a flowchart indicative of one example of an overall processing procedure of the above-mentioned image taking apparatus 300.

Now, referring to FIG. 13, there is shown one example of an entire processing procedure of the image taking apparatus 300 in one embodiment of the invention. The image monitor 370 of the image taking apparatus 300 constantly displays a taken image (or a through-image) (step S901). When a shutter (not shown) is pressed by the user (step S902), a still image taken thereupon (or a captured image) is compressed (step S910) to be stored in the image memory 360.

Next, the captured image data is read from the image memory 360 and decompressed (step S920) to be subjected to various signal processing operations (step S903). Then, the signal-processed image data is encoded into a predetermined format to be recorded to the external recording media 380 (step S904).

Figure 14:
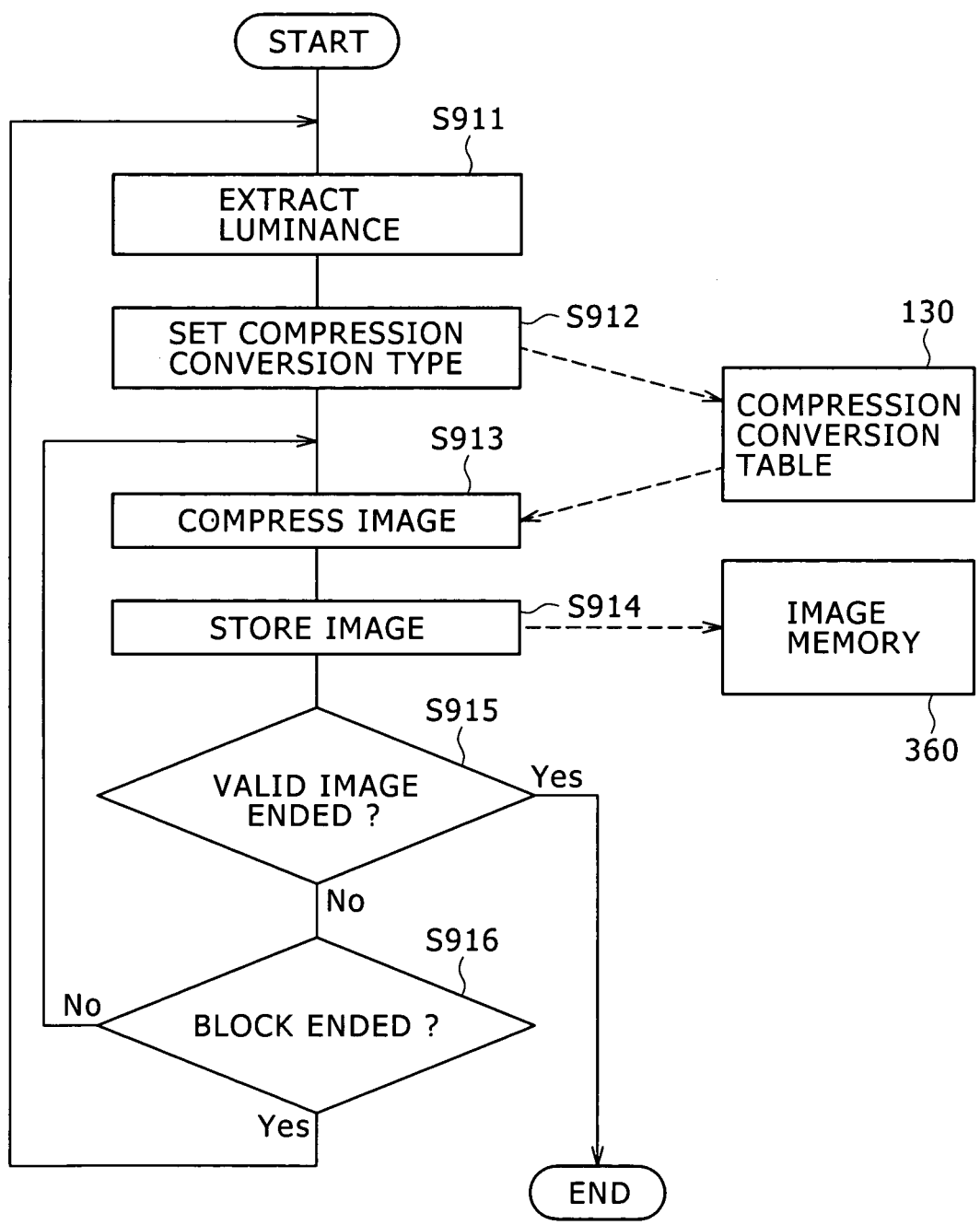
FIG. 14 is a flowchart indicative of one example of a processing procedure of a captured image compression processing practiced as yet another embodiment of the invention.

Referring to FIG. 14, there is shown one example of a processing procedure of captured image compression processing in one embodiment of the invention. When the luminance information of the original data is extracted by the luminance extraction block 110 (step S911), the compression conversion rule setting block 120 sets a compression conversion rule to the compression conversion table 130 (step S912).

Next, the image compression block 140 references the compression conversion rule set to the compression conversion table 130 to compress the original image data (step S913). The image data thus compressed is held in the image memory 360 along with the type of the compression conversion rule used (step S914).

When the processing of all valid image data has been completed, this processing procedure comes to an end (step S915). On the other hand, if there remain any other valid image data, it is determined whether the processing on the image data in the image block providing a unit of luminance information extraction has been completed (step S916). If the processing in the image block is found completed (step S911), then the subsequent processing is repeated; otherwise, the processing subsequent to the image compression (step S913) is repeated on the remaining image data.

Figure 15:
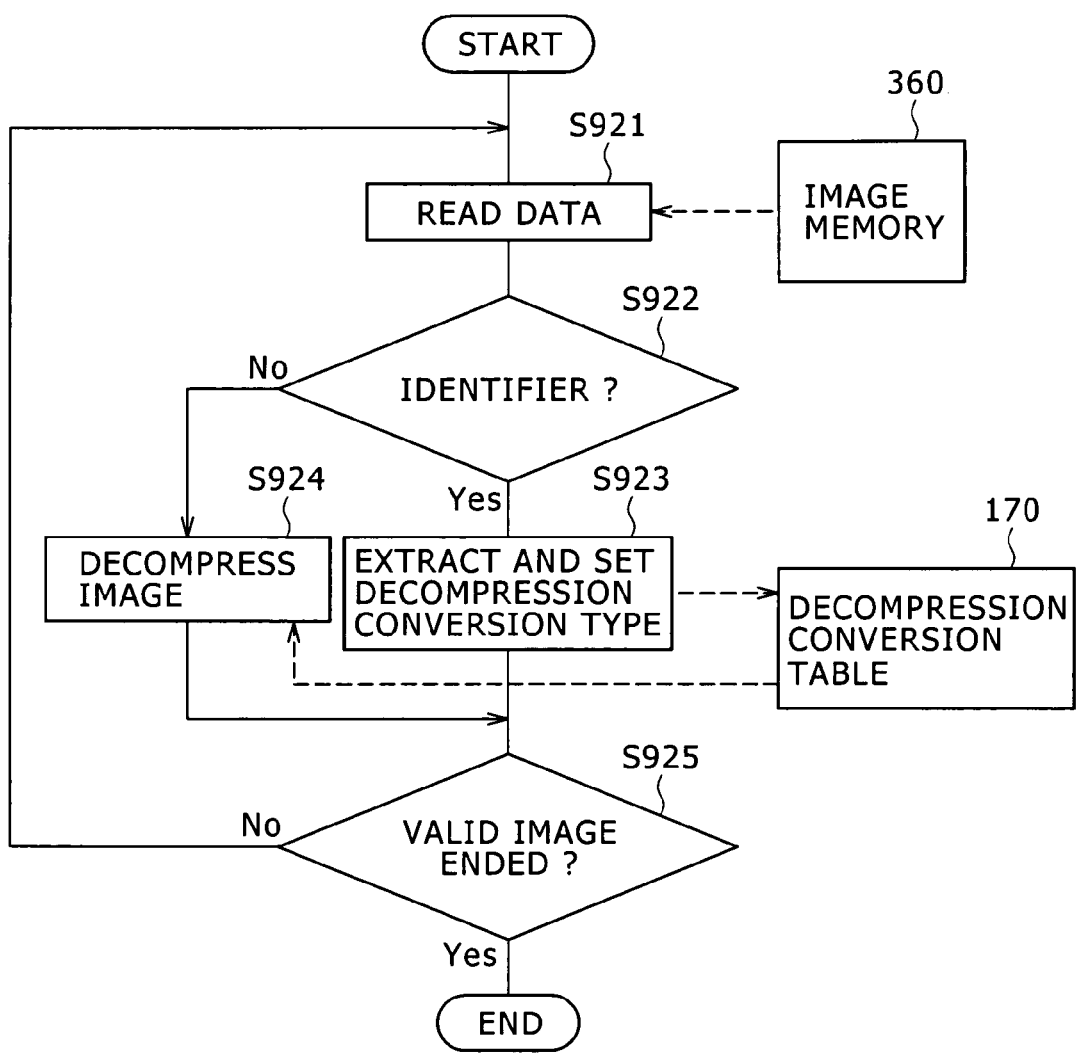
FIG. 15 is a flowchart indicative of one example of a processing procedure of captured image decompression processing practiced as a different embodiment of the invention.

Referring to FIG. 15, there is shown one example of a processing procedure of captured image decompression processing in one embodiment of the invention. Data is read from the image memory 360 (step S921) and, if the data is an identifier ("11111111" in the example of FIGS. 10A and 10B) (step S922), the type of compression conversion that follows is extracted by the decompression conversion rule setting block 160 to set the decompression conversion rule to the decompression conversion table 170 (step S923).

On the other hand, if the read data is found to be other than an identifier (step S922), then the image decompression block 180 references the decompression conversion rule set to the decompression conversion table 170 to decompress the compressed image data (step S924). Then, when the processing on all valid image data has been completed, this processing procedure comes to an end (step S925).

Thus, according to embodiments of the invention, the compression conversion rule is set to the compression conversion table 130 by the compression conversion rule setting block 120 on the basis of the luminance information extracted by the luminance extraction block 110 and then the original image data is compressed by the image compression block 140 in accordance with this compression conversion rule to be held in the image memory 150 along with the type of the compression conversion rule used, thereby reducing the required storage capacity of the image memory 150. The type of the compression conversion rule held in the image memory 150 is extracted by the decompression conversion rule setting block 160 and, in accordance with the extracted type, the decompression conversion rule is set to the decompression conversion table 170. In accordance with the decompression conversion rule set to the decompression conversion table 170, the image decompression block 180 decompresses the compressed image data in the image memory 150.

Consequently, when the original image data taken by the imaging device 320 is compressed by the image compression block 140, the compression conversion rules can be adaptively changed by use of the information about the through-image to execute the compression processing suitable for that original image data, thereby minimizing the deterioration of image quality that is caused by the compression processing. The realtime property of the processing speed can be enhanced by reflecting the luminance information of the through-image to be used for adaptive compression before the valid image area of a next frame begins. Further, dividing the compression conversion table 130 and the decompression conversion table 170 each into a fixed area and variable areas makes it unnecessary to reset the compression conversion rule or the decompression conversion rule in the fixed area, thereby enhancing the speeds of compression and decompression. These enhancements in the realtime-ness and the speeds of compression and decompression in turn contribute to shortened continuous shooting speed, for example.

Further, the required memory capacity and hardware scale can be reduced by compressing the original image data taken by the imaging device 320 and storing the compressed data into the image memory 150 to lower the ratio in which the image memory 150 occupies the chip area. This leads to the reduced capacity of the image memory necessary for taking one frame of a still image, so that the number of shots in the continuous shooting, one the basic capabilities of the digital still camera for example can be increased. In addition, setting only the representative points of each conversion curve to the compression conversion table 130 and the decompression conversion table 170 can minimize the hardware scale for use in the compression and decompression processing. Besides, the power dissipation can be reduced by compressively storing the original image data taken by the imaging device 320 into the image memory 150 to reduce the number of times memory access is made. This in turn leads to the longer battery life in the digital still camera.

While preferred embodiments of the present invention have been described using specific terms, such description is for illustrative purpose only, and it is to be understood that changes and variations may be made without departing from the spirit or scope of the following claims.

To be more specific, in claim 1, conversion rule holding means corresponds to the compression conversion table 130, for example. Luminance extraction means corresponds to the luminance extraction block 110. Conversion rule setting means corresponds to the compression conversion rule setting block 120, for example. Image conversion means corresponds to the image compression block 140, for example.

In claim 2, compression conversion rule holding means corresponds to the compression conversion table 130, for example. Luminance extraction means corresponds to the luminance extraction block 110, for example. Compression conversion rule setting means corresponds to the compression conversion rule setting block 120, for example. Image compression means corresponds to the image compression block 140, for example. An image memory corresponds to the image memory 150, for example. Decompression conversion rule holding means corresponds to the decompression conversion table 170, for example. Decompression conversion rule setting means corresponds to the decompression conversion rule setting block 160, for example. Image decompression means corresponds to the image decompression block 180, for example. Signal processing means corresponds to the signal processing block 190, for example.

In claim 4, pointer holding means corresponds to the table pointer 394, for example. Decision means corresponds to the comparator 396, for example.

In claim 6, pointer holding means corresponds to the table pointer 397, for example.

In claim 7, blanking intervals correspond to the H blanking intervals 325 and 326 and the V blanking intervals 327 and 328, for example.

In claim 12, imaging means corresponds to the imaging device 320, for example. A front end corresponds to the front end 340, for example. Compression conversion rule holding means corresponds to the compression conversion table 130, for example. Luminance extraction means corresponds to the luminance extraction block 110, for example. Compression conversion rule setting means corresponds to the compression conversion rule setting block 120, for example. Image compression means corresponds to the image compression block 140, for example. An image memory corresponds to the image memory 150, for example. Decompression conversion rule holding means corresponds to the decompression conversion table 170, for example. Decompression conversion rule setting means corresponds to the decompression conversion rule setting block 160, for example. Image decompression means corresponds to the image decompression block 180, for example. Signal processing means corresponds to the signal processing block 190, for example. Image recording means corresponds to the external recording media 380, for example.

In claims 13 or 14, compression conversion rule holding means corresponds to the compression conversion table 130, for example. An image memory corresponds to the image memory 150, for example. Decompression conversion rule holding means corresponds to the decompression conversion table 170, for example. A procedure for extracting the luminance information associated with original image data corresponds to step S911, for example. A procedure for setting the compression conversion rule in the compression conversion rule holding means in accordance with luminance information corresponds to step S912, for example. A procedure for compressing the original image data into compressed image data in accordance with the compression conversion rule held in the compression conversion rule hold means corresponds to step S913, for example. A procedure for storing the compressed image data into the image memory along with the type of compression conversion rule corresponds to step S914, for example. A procedure for reading data from the image memory corresponds to step S921, for example. A procedure for extracting the type of compression conversion rule if the read data is a predetermined identifier and setting the decompression conversion rule in the decompression conversion rule holding means on the basis of the extracted type corresponds to step S923, for example. A procedure for decompressing, if the read data is compressed image data, that compressed image data in accordance with the decompression conversion rule held in the decompression conversion rule holding means corresponds to step S924, for example. A procedure for executing predetermined signal processing on the decompressed image data corresponds to step S903, for example.

It should be noted that the processing procedures used in the above-mentioned description of the embodiments of the invention may considered as a method made up of a sequence of procedures or a program for making a computer execute the sequence of these procedures or a storage media storing this program.

INDUSTRIAL APPLICABILITY

As described and according to the invention, a simple compression and decompression method provides excellent effects by reducing the storage capacity of an image memory, while adapting to the properties of image.

The present invention is applicable to the reduction of the image memory capacity in image taking apparatuses such as the digital still camera, for example.

The invention claimed is:

1. An image processing apparatus comprising:
   means for holding a plurality of conversion rules for original image data taken by an imaging device;
   means for extracting luminance information associated with said original image data;
   means for setting, from a plurality of predetermined compression conversion rules, a variable portion of each conversion rule from said plurality of conversion rules held in said means for holding on the basis of said luminance information indicating an amount of luminance of the original image data; and
   means for converting a first portion of said original image data on the basis of said luminance information in accordance with said variable portion of each conversion rule from said plurality of conversion rules held in said means for holding and for converting a second portion of said original image data independent of said luminance information in accordance with a fixed portion of each conversion rule from said plurality of conversion rules held, independent of luminance information, in said means for holding, wherein the means for setting sets a first of the plurality of predetermined compression conversion rules in the variable portion when the amount of luminance information is below a first threshold, sets a second of the plurality of predetermined compression conversion rules in the variable portion when the amount of luminance third of the plurality of predetermined compression conversion rules in the variable portion when the amount of luminance information is above the second threshold.

2. An image processing apparatus comprising:

first means for holding a plurality of compression conversion rules for original image data taken by an imaging device;

first means for extracting luminance information associated with said original image data;

means for setting, from a plurality of predetermined compression conversion rules, a variable portion of each compression conversion rule from said plurality of compression conversion rules held in said first means for holding on the basis of said luminance information indicating an amount of luminance of the original image data;

means for compressing a first portion of said original image data into compressed image data on the basis of said luminance information in accordance with said variable portion of each compression conversion rule from said plurality of compression conversion rules held in said first means for holding and for compressing a second portion of said original image data into compressed image data independent of said luminance information in accordance with a fixed portion of each compression conversion rule from said plurality of compression conversion rules held, independent of luminance information, in said first means for holding;

an image memory for holding said compressed image data along with a type of said variable portion of each compression conversion rule from said plurality of compression conversion rules;

second means for holding a decompression conversion rule for said compressed image data;

second means for extracting said type held in said image memory and setting a corresponding variable portion of said decompression conversion rule in said second means for holding on the basis of said type;

means for decompressing said compressed image data into decompressed image data in accordance with said decompression conversion rule held in said second means for holding; and means for executing predetermined signal processing on said decompressed image data, wherein the first means for setting sets a first of the plurality of predetermined compression conversion rules in the variable portion when the amount of luminance information is below a first threshold, sets a second of the plurality of predetermined compression conversion rules in the variable portion when the amount of luminance information is above the first threshold and below a second threshold, and sets a third of the plurality of predetermined compression conversion rules in the variable portion when the amount of luminance information is above the second threshold.

3. The image processing apparatus according to claim 2, wherein said first means for holding has a fixed area for holding said fixed portion of each compression conversion rule from said plurality of compression conversion rules independent of luminance information in a fixed manner and a variable area for holding said variable portion of each compression conversion rule from said plurality of compression conversion rules that is set in accordance with said luminance information by said means for setting 4. The image processing apparatus according to claim 3 further comprising:

means for holding a pointer for said variable area of said first means for holding; and means for deciding a type of each compression conversion rule from said plurality of compression conversion rules in accordance with said luminance information thereby setting said pointer.

5. The image processing apparatus according to claim 2, wherein said second means for holding has a fixed area for holding said decompression conversion rule in a fixed manner and a variable area that is set on the basis of the type of said decompression conversion rule by said second means for holding.

6. The image processing apparatus according to claim 5 further comprising:

means for holding a pointer for said variable area of said second means for holding;

wherein said pointer is set on the basis of said type held in said image memory.

7. The image processing apparatus according to claim 2, wherein said means for setting sets each compression conversion rule from said plurality of compression conversion rules within a blanking interval in said imaging device.

8. The image processing apparatus according to claim 2, wherein said means for setting sets each compression conversion rule from said plurality of compression conversion rules on an image frame basis.

9. The image processing apparatus according to claim 2, wherein said means for setting sets each compression conversion rule from said plurality of compression conversion rules on a predetermined image block basis.

10. The image processing apparatus according to claim 2, wherein said means for compressing compresses said original image data by executing predetermined interpolation on each compression conversion rule from said plurality of compression conversion rules held in said first means for holding.

11. The image processing apparatus according to claim 2, wherein said means for decompressing decompresses said compressed image data by executing predetermined interpolation on said decompression conversion rule held in said second means for holding.

12. An image taking apparatus comprising:

means for taking an image;

a front end for converting said taken image into original image data;

first means for holding a plurality of compression conversion rules for said original image data;

first means for extracting luminance information associated with said original image data;

means for setting, from a plurality of predetermined compression conversion rules, a variable portion of each compression conversion rule from said plurality of compression conversion rules held in said first means for holding on the basis of said luminance information indicating an amount of luminance of the original image data;

means for compressing a first portion of said original image data into compressed image data on the basis of said luminance information in accordance with said variable portion of each compression conversion rule from said plurality of compression conversion rules held in said first means for holding and for compressing a second portion of said original image data into compressed image data independent of said luminance information in accordance with a fixed portion of each compression conversion rule from said plurality of compression conversion rules held, independent of luminance information, in said first means for holding;

an image memory for holding said compressed image data along with a type of said variable portion of each compression conversion rule from said plurality of compression conversion rules;

second means for holding a decompression conversion rule for said compressed image data;

second means for extracting said type held in said image memory and setting a corresponding variable portion of said decompression conversion rule in said second means for holding in accordance with said type;

means for decompressing said compressed image data into decompressed image data in accordance with said decompression conversion rule held in said second means for holding;

means for executing predetermined signal processing on said decompressed image data; and third means for holding said signal-processed image data into a recording media, wherein the first means for setting sets a first of the plurality of predetermined compression conversion rules in the variable portion when the amount of luminance information is below a first threshold, sets a second of the plurality of predetermined compression conversion rules in the variable portion when the amount of luminance information is above the first threshold and below a second threshold, and sets a third of the plurality of predetermined compression conversion rules in the variable portion when the amount of luminance information is above the second threshold.

13. An image processing method implemented by an image processing apparatus having a first means for holding a plurality of compression conversion rule for original image data taken by an imaging device, an image memory for holding compressed image data obtained by compressing said original image data, and second means for holding a decompression conversion rule for said compressed image data, said image processing method comprising:

extracting luminance information associated with said original image data;

setting, from a plurality of predetermined compression conversion rules, a variable portion of each compression conversion rule from said plurality of compression conversion rules held in said first means for holding on the basis of said luminance information indicating an amount of luminance of the original image data;

compressing a first portion of said original image data into said compressed image data on the basis of said luminance information in accordance with said variable portion of each compression conversion rule from said plurality of compression conversion rules held in said first means for holding and compressing a second portion of said original image data into compressed image data independent of said luminance information in accordance with a fixed portion of each compression conversion rule from said plurality of compression conversion rules held, independent of luminance information, in said first means for holding;

storing said compressed image data into said image memory along with a type of said variable portion of each compression conversion rule from said plurality of compression conversion rules;

reading data from said image memory;

extracting, when said read data is a predetermined identifier, said type and setting a corresponding variable portion of said decompression conversion rule in said second means for holding on the basis of said type;

decompressing, when said read data is said compressed image data, said compressed image data into decompressed image data in accordance with said decompression conversion rule held in said second means for holding; and executing predetermined signal processing on said decompressed image data, wherein the first means for setting sets a first of the plurality of predetermined compression conversion rules in the variable portion when the amount of luminance information is below a first threshold, sets a second of the plurality of predetermined compression conversion rules in the variable portion when the amount of luminance information is above the first threshold and below a second threshold, and sets a third of the plurality of predetermined compression conversion rules in the variable portion when the amount of luminance information is above the second threshold.

14. A non-transitory computer readable medium storing therein a program which, when executed by a processor of an image processing apparatus, causes the image processing apparatus having a first means for holding a plurality of compression conversion rules for original image data taken by an imaging device, an image memory for holding compressed image data obtained by compressing said original image data, and second means for holding a decompression conversion rule for said compressed image data to execute a method comprising:

extracting luminance information associated with said original image data;

setting, from a plurality of predetermined compression conversion rules, a variable portion of each compression conversion rule from said plurality of compression conversion rules held in said first means for holding on the basis of said luminance information indicating an amount of luminance of the original image data;

compressing a first portion of said original image data into said compressed image data on the basis of said luminance information in accordance with said variable portion of each compression conversion rule from said plurality of compression conversion rules held in said first means for holding and compressing a second portion of said original image data into compressed image data independent of said luminance information in accordance with a fixed portion of each compression conversion rule from said plurality of compression conversion rules held, independent of luminance information, in said first means for holding;

storing said compressed image data into said image memory along with a type of said variable portion of each compression conversion rule from said plurality of compression conversion rules;

reading data from said image memory;

extracting, when said read data is a predetermined identifier, said type and setting a corresponding variable portion of said decompression conversion rule in said second means for holding on the basis of said type;

decompressing, when said read data is said compressed image data, said compressed image data into decompressed image data in accordance with said decompression conversion rule held in said second means for holding; and executing predetermined signal processing on said decompressed image data, wherein the first means for setting sets a first of the plurality of predetermined compression conversion rules in the variable portion when the amount of luminance information is below a first threshold, sets a second of the plurality of predetermined compression conversion rules in the variable portion when the amount of luminance information is above the first threshold and below a second threshold, and sets a third of the plurality of predetermined compression conversion rules in the variable portion when the amount of luminance information is above the second threshold.

15. The image processing apparatus according to claim 1, wherein the first threshold is a luminance value of 90 and the second threshold is a luminance value of 180.

16. The image processing apparatus according to claim 1, wherein the first threshold is a luminance value of 50 and the second threshold is a luminance value of 190.

17. The image processing apparatus according to claim 1, wherein the plurality of predetermined compression conversion rules specify compression rules for converting the original image data from 16-gray-scale image-data to 8-gray-scale image data.

\* \* \* \* \*